US011911790B2

(12) United States Patent
Al Hennawi

(10) Patent No.: US 11,911,790 B2
(45) Date of Patent: Feb. 27, 2024

(54) APPLYING CORROSION INHIBITOR WITHIN TUBULARS

(71) Applicant: Saudi Arabian Oil Company, Dhahran (SA)

(72) Inventor: Qais Mohammad Al Hennawi, Hashemite (JO)

(73) Assignee: Saudi Arabian Oil Company, Dhahran (SA)

( * ) Notice: Subject to any disclaimer, the term of this patent is extended or adjusted under 35 U.S.C. 154(b) by 123 days.

(21) Appl. No.: 17/681,261

(22) Filed: Feb. 25, 2022

(65) Prior Publication Data

US 2023/0271220 A1 Aug. 31, 2023

(51) Int. Cl.

| | |
|---|---|
| ***B05B 13/06*** | (2006.01) |
| ***B05C 1/06*** | (2006.01) |
| ***B05C 7/08*** | (2006.01) |
| ***B05C 7/02*** | (2006.01) |
| ***B05D 3/12*** | (2006.01) |
| ***B05D 7/22*** | (2006.01) |
| ***C23F 11/00*** | (2006.01) |

(Continued)

(52) U.S. Cl.

CPC .................. *B05D 3/12* (2013.01); *B05B 1/20* (2013.01); *B05B 13/0627* (2013.01); *B05C 1/06* (2013.01); *B05C 7/02* (2013.01); *B05C 7/08* (2013.01); *B05D 1/02* (2013.01); *B05D 7/225* (2013.01); *C23F 11/00* (2013.01); *B05D 7/222* (2013.01)

(58) Field of Classification Search

None

See application file for complete search history.

(56) References Cited

U.S. PATENT DOCUMENTS

| | | | |
|---|---|---|---|
| 141,620 | A | 8/1873 | Barton, Jr. |
| 418,339 | A | 12/1889 | Seehausen |

(Continued)

FOREIGN PATENT DOCUMENTS

| | | |
|---|---|---|
| CN | 2362091 | 2/2000 |
| CN | 202599174 | 12/2012 |

(Continued)

OTHER PUBLICATIONS

Saltel et al., "In-Situ Polymerisation of an Inflatable Composite Sleeve to Reline Damaged Tubing and Shut-Off Perforation," SPE 8202, presented at the Offshore Technology Conference, May 6-9, 1996, 9 pages.

(Continued)

*Primary Examiner* — Binu Thomas

(74) *Attorney, Agent, or Firm* — Fish & Richardson P.C.

(57) ABSTRACT

A central tubular defines a central flow passage and spray nozzles along an outer circumference of the central tubular. A first brush pig supports a first end of the central tubular. A second brush pig supports a second end of the tubular. An inflatable balloon is at the second end of the tubular. The inflatable balloon is encircled by the second brush pig. The inflatable balloon is configured to cause a first pressure drop across the balloon when in an inflated state and cause a second pressure drop, less than the first pressure drop, across the balloon when in a deflated state. A flow control system is at the first end of the tubular and is configured to regulate fluid exchange with the tubular and fluid exchange with the inflatable balloon.

14 Claims, 7 Drawing Sheets

(51) Int. Cl.
*B05B 1/20* (2006.01)
*B05D 1/02* (2006.01)

(56) References Cited

U.S. PATENT DOCUMENTS

| | | | | |
|---|---|---|---|---|
| 665,912 | A | | 1/1901 | Jolicard |
| 779,741 | A | | 1/1905 | Schneubner |
| 876,453 | A | | 1/1908 | Heard |
| 1,546,714 | A | | 9/1922 | Buzbee |
| 2,513,289 | A | * | 7/1950 | Crom .................. B28B 19/0023 118/317 |
| 2,914,377 | A | | 11/1951 | Bull |
| 2,760,584 | A | | 7/1952 | Rohrback |
| 2,837,323 | A | | 6/1955 | Goodrie |
| 2,884,942 | A | | 5/1957 | Caldwell et al. |
| 2,804,148 | A | | 8/1957 | Schremp et al. |
| 3,056,664 | A | | 3/1959 | Dravnieks et al. |
| 2,957,189 | A | * | 10/1960 | Nelson .................. B08B 9/0553 15/104.19 |
| 3,111,431 | A | * | 11/1963 | Weaver ..................... B05C 7/08 118/DIG. 10 |
| 3,125,464 | A | * | 3/1964 | Harmes ..................... B05C 7/08 118/DIG. 10 |
| 3,302,717 | A | | 2/1967 | West et al. |
| 3,354,955 | A | | 11/1967 | Berry |
| 3,419,080 | A | | 12/1968 | Lebourg |
| 3,435,890 | A | | 4/1969 | Junkermann |
| 3,445,370 | A | | 5/1969 | Sherman |
| 3,447,321 | A | | 6/1969 | Romero |
| 3,525,398 | A | | 8/1970 | Fisher |
| 3,762,476 | A | | 10/1973 | Gall |
| 3,842,596 | A | | 10/1974 | Gray |
| 3,885,521 | A | * | 5/1975 | von Arx .................... B05C 7/08 118/DIG. 10 |
| 3,910,347 | A | | 10/1975 | Woebcke |
| 3,960,644 | A | * | 6/1976 | McFadden .......... B05B 13/0636 118/713 |
| 3,996,124 | A | | 12/1976 | Eaton et al. |
| 4,163,770 | A | | 8/1979 | Porosoff |
| 4,179,920 | A | | 12/1979 | Schuller et al. |
| 4,474,230 | A | | 10/1984 | McCallister |
| 4,508,389 | A | | 4/1985 | Hodges |
| 4,572,295 | A | | 2/1986 | Walley |
| 4,729,424 | A | | 3/1988 | Mizuno et al. |
| 4,817,721 | A | | 4/1989 | Pober |
| 4,886,086 | A | | 12/1989 | Etchells et al. |
| 4,921,041 | A | | 5/1990 | Akachi |
| 5,014,777 | A | | 5/1991 | Sano |
| 5,019,417 | A | * | 5/1991 | Northcutt .................. B05C 7/08 118/DIG. 10 |
| 5,161,615 | A | | 11/1992 | Hutchins et al. |
| 5,230,842 | A | * | 7/1993 | Munde .................... F16L 55/26 118/DIG. 10 |
| 5,332,031 | A | | 7/1994 | Kiga |
| 5,348,076 | A | | 9/1994 | Asakawa |
| 5,388,958 | A | | 2/1995 | Dinh |
| 5,427,655 | A | | 6/1995 | Woebcke |
| 5,715,945 | A | | 2/1998 | Chandler |
| 5,737,840 | A | | 4/1998 | Akachi |
| 5,741,293 | A | | 4/1998 | Wijay |
| 5,813,243 | A | | 9/1998 | Johnson et al. |
| 5,854,145 | A | | 12/1998 | Chandler et al. |
| 6,026,890 | A | | 2/2000 | Akachi |
| 6,102,120 | A | | 8/2000 | Chen et al. |
| 6,253,422 | B1 | | 7/2001 | Zipp |
| 6,431,282 | B1 | | 8/2002 | Bosma et al. |
| 6,439,384 | B2 | | 8/2002 | Martin |
| 6,452,068 | B1 | | 9/2002 | Zuo et al. |
| 6,540,777 | B2 | | 4/2003 | Stenzel |
| 6,551,552 | B1 | | 4/2003 | Lyublinski et al. |
| 6,672,385 | B2 | | 1/2004 | Kilaas et al. |
| 6,742,583 | B2 | | 6/2004 | Tikka |
| 6,834,725 | B2 | | 12/2004 | Whanger et al. |
| 6,886,362 | B2 | | 5/2005 | Wilding |
| 7,112,350 | B1 | * | 9/2006 | Roberts .................. B05D 7/222 427/427.2 |
| 7,357,189 | B2 | | 4/2008 | Aldaz et al. |
| 7,380,595 | B2 | | 6/2008 | Wetzel et al. |
| 7,665,537 | B2 | | 2/2010 | Patel et al. |
| 7,823,374 | B2 | | 11/2010 | Venkataramani et al. |
| 7,845,159 | B2 | | 12/2010 | Venkataramani et al. |
| 8,261,601 | B2 | | 9/2012 | Stolle et al. |
| 8,507,034 | B2 | | 8/2013 | Achour et al. |
| 8,523,936 | B2 | | 9/2013 | Schmid et al. |
| 8,575,237 | B1 | | 11/2013 | Zaid et al. |
| 8,618,027 | B2 | | 12/2013 | Meyer et al. |
| 9,052,042 | B2 | | 6/2015 | May |
| 9,175,405 | B2 | | 11/2015 | Gill et al. |
| 9,198,234 | B2 | | 11/2015 | Blue et al. |
| 10,851,612 | B2 | | 12/2020 | Al-Gouhi et al. |
| 2004/0144535 | A1 | | 7/2004 | Kalman et al. |
| 2005/0155773 | A1 | | 7/2005 | Wetzel et al. |
| 2009/0178809 | A1 | | 7/2009 | Jeffryes et al. |
| 2010/0147056 | A1 | | 6/2010 | Stolle et al. |
| 2011/0227431 | A1 | | 9/2011 | Af Ursin |
| 2012/0055667 | A1 | | 3/2012 | Ingram et al. |
| 2013/0220641 | A1 | | 8/2013 | Fripp et al. |
| 2014/0242299 | A1 | | 8/2014 | Okamura et al. |
| 2014/0299158 | A1 | * | 10/2014 | Cooper ................... B08B 9/043 134/22.12 |
| 2014/0299331 | A1 | | 10/2014 | Hart et al. |
| 2014/0343332 | A1 | | 11/2014 | Pou et al. |
| 2015/0267501 | A1 | * | 9/2015 | Al-Gouhi ................ E21B 33/12 166/299 |
| 2018/0112490 | A1 | | 4/2018 | Al-Gouhi et al. |

FOREIGN PATENT DOCUMENTS

| | | |
|---|---|---|
| DE | 102015004021 | 9/2016 |
| EP | 0546798 | 6/1993 |
| EP | 3230493 | 10/2017 |
| GB | 766786 | 1/1957 |
| WO | WO 8500003 | 1/1985 |
| WO | WO 2003103942 | 12/2003 |
| WO | WO 2011135360 | 11/2011 |
| WO | WO 2018057361 | 3/2018 |
| WO | WO 2018098303 | 5/2018 |
| WO | WO 2018211450 | 11/2018 |

OTHER PUBLICATIONS ceramicindustry.com' [online], "Microwave Heating of Ceramics," Oct. 1, 2015, [retrieved on May 15, 2018], retrieved from URL: <https://www.ceramicindustry.com/articles/95044-microwave-heating-of-ceramics>, 4 pages.

* cited by examiner

APPLYING CORROSION INHIBITOR WITHIN TUBULARS

TECHNICAL FIELD

This disclosure relates to applying corrosion inhibitors within tubulars, such as wellbores or flowlines.

BACKGROUND

When producing hydrocarbons, the interior of piping is often exposed to corrosive agents, such as carboxylic acid or hydrogen sulfide. The two ways to counteract these agents within the piping is to construct the piping out of a material compatible with the corrosive agents, or to inject corrosion inhibitor chemicals into the piping with the corrosive agents. Constructing the piping out of corrosion resistant materials incurs high capital cost. In addition, production fluid characteristics change over time. For example, a production facility may begin life processing non-corrosive fluids, only to be exposed to corrosion fluids later in life. Injecting corrosion inhibitor has a lower capital cost in comparison to constructing a facility with corrosion resistant materials, though the operation costs can be higher due to the continual injection of chemicals. Injecting corrosion inhibitor is also a flexible option. For example, corrosion inhibitor can be added or injected only in systems that are currently experiencing corrosive fluid production.

SUMMARY

This disclosure describes technologies relating to applying corrosion inhibitor within tubulars.

An example implementation of the subject matter described within this disclosure is a tool system with the following features. A central tubular defines a central flow passage and spray nozzles along an outer circumference of the central tubular that fluidically connect the flow passage to an outside environment. The tubular is configured to receive fluid from a corrosion inhibitor pump and direct the fluid along an inner circumference of a tubular in which the tool is inserted. A first brush pig supports a first end of the central tubular. The first brush pig is configured to support the first end of the central tubular. A second brush pig supports a second end of the tubular. The second brush pig is configured to support the second end of the central tubular. An inflatable balloon is at the second end of the tubular. The inflatable balloon is encircled by the second brush pig. The inflatable balloon is configured to cause a first pressure drop across the balloon when in an inflated state and cause a second pressure drop, less than the first pressure drop, across the balloon when in a deflated state. A flow control system is at the first end of the tubular. The flow control system is configured to regulate fluid exchange with the tubular and fluid exchange with the inflatable balloon. The flow control system is configured to receive a chemical injection line connected to a corrosion inhibitor pump.

Aspects of the example tool system, which can be combined with the example tool system alone or in combination with other aspects, include the following. The first brush pig includes an outer ring defining an inner surface and an outer surface. A brush emits from the outer surface of the ring. An inner ring is radially centered within the outer ring. The inner ring is configured to support the tubular. A support bar extends between an outer surface of the inner ring and an inner surface of the outer ring. The support bar supports the inner ring to the outer ring.

The second brush pig includes an outer ring defining an inner surface and an outer surface. A brush emits from the outer surface of the ring. An inner ring radially is radially centered within the outer ring. The inner ring is configured to support the tubular and the balloon. A first support bar extends between an outer surface of the inner ring and an inner surface of the outer ring. The support bar supports the inner ring to the outer ring. A second support bar extends between an outer surface of the inner ring and an inner surface of the outer ring. The support bar supports the inner ring to the outer ring. The first support bar and the second support bar axially retain the balloon. A solid disk is between the inner ring and the outer ring. The solid disk is supported by the outer ring. The solid disk surrounds the balloon.

Aspects of the example tool system, which can be combined with the example tool system alone or in combination with other aspects, include the following. The flow control system includes a directional valve configured to direct fluid flow to the tubular or the inflatable balloon. A first check valve is between the directional control valve and the tubular. The first check valve is configured to direct fluid flow towards the tubular. A second check valve is between the directional control valve and the inflatable balloon. The second check valve is configured to direct fluid flow towards the balloon.

Aspects of the example tool system, which can be combined with the example tool system alone or in combination with other aspects, include the following. The directional valve is an electronically controlled valve.

Aspects of the example tool system, which can be combined with the example tool system alone or in combination with other aspects, include the following. The electronically controlled valve is configured to be controlled by a controller at a corrosion inhibitor pump.

Aspects of the example tool system, which can be combined with the example tool system alone or in combination with other aspects, include the following. A relief valve is at a downhole end of the tool. The relief valve is configured to release pressure from the inflatable balloon.

An example implementation of the subject matter described within this disclosure includes a method with the following features. A tool is received by a tubular. The tool includes a central tubular defining a central flow passage and spray nozzles fluidically connecting the flow passage to an outside environment. A first brush pig supports a first end of the tubular. A second brush pig supports a second end of the tubular. An inflatable balloon is at the second end of the tubular. The inflatable balloon is encircled by the second brush pig. A flow control system is at the first end of the tubular. The flow control system is configured to regulate fluid exchange with the tubular and fluid exchange with the inflatable balloon. The flow control system is configured to receive a chemical injection line. Corrosion inhibitor is applied to an inner surface of the tubular by the tool.

Aspects of the example method, which can be combined with the example method alone or in combination with other aspects, include the following. The balloon is inflated by the corrosion inhibitor. A pressure differential is created across the tool responsive to inflating the balloon. The tool is moved in a downhole direction responsive to the pressure differential.

Aspects of the example method, which can be combined with the example method alone or in combination with other aspects, include the following. Applying corrosion inhibitor to an inner surface of the tubular includes spraying corrosion inhibitor, by the central tubular, onto an inner surface of the tubular. The corrosion inhibitor is spread by a brush along an outer surface of the first brush pig or the second brush pig.

Aspects of the example method, which can be combined with the example method alone or in combination with other aspects, include the following. The balloon is deflated by a relief valve fluidically coupled to the balloon. The tool is moved in an uphole direction by tension in a chemical supply line configured to supply corrosion inhibitor to the tool from a corrosion inhibitor pump.

Aspects of the example method, which can be combined with the example method alone or in combination with other aspects, include the following. The tubular includes a wellbore.

An example implementation of the subject matter described within this disclosure is an example system with the following features. A hose is coupled to a hose reel. A chemical injection pump is arranged to supply corrosion inhibitor through the hose. A tool includes a central tubular defining a central flow passage and spray nozzles fluidically connecting the flow passage to an outside environment. A first brush pig supports a first end of the tubular. A second brush pig supporting a second end of the tubular. An inflatable balloon is at the second end of the tubular. The inflatable balloon is encircled by the second brush pig. A flow control system is at the first end of the tubular. The flow control system is configured to regulate fluid exchange with the tubular and fluid exchange with the inflatable balloon. The flow control system is configured to receive a chemical injection line.

Aspects of the example system, which can be combined with the example system alone or in combination with other aspects, include the following. The first brush pig includes an outer ring defining an inner surface and an outer surface. A brush emits from the outer surface of the ring. An inner ring is radially centered within the outer ring. The inner ring is configured to support the tubular. A support bar extends between an outer surface of the inner ring and an inner surface of the outer ring. The support bar supports the inner ring to the outer ring.

Aspects of the example system, which can be combined with the example system alone or in combination with other aspects, include the following. The second brush pig includes an outer ring defining an inner surface and an outer surface. A brush emits from the outer surface of the ring. An inner ring is radially centered within the outer ring. The inner ring is configured to support the balloon. A support bar extends between an outer surface of the inner ring and an inner surface of the outer ring. The support bar supports the inner ring to the outer ring. A solid disk is between the inner ring and the outer ring. The solid disk is supported by the outer ring.

Aspects of the example system, which can be combined with the example system alone or in combination with other aspects, include the following. The flow control system includes a directional valve configured to direct fluid flow to the tubular or the inflatable balloon. A first check valve is between the directional control valve and the tubular. The first check valve is configured to direct fluid flow towards the tubular. A second check valve is between the directional control valve and the inflatable balloon. The second check valve is configured to direct fluid flow towards the balloon.

Aspects of the example system, which can be combined with the example system alone or in combination with other aspects, include the following. The directional valve is an electronically controlled valve.

Aspects of the example system, which can be combined with the example system alone or in combination with other aspects, include the following. The electronically controlled valve is configured to be controlled by a controller at a corrosion inhibitor pump.

Aspects of the example system, which can be combined with the example system alone or in combination with other aspects, include the following. A relief valve is at a downhole end of the tool. The relief valve is configured to release pressure from the inflatable balloon.

Particular implementations of the subject matter described in this disclosure can be implemented so as to realize one or more of the following advantages. The subject matter described herein allows for an even distribution of fresh corrosion inhibitor across an entire interior surface of a tubular. The subject matter described herein reduces the amount of corrosion inhibitor needed to be effective compared to traditional methods. Alternatively or in addition, the subject matter described herein allows for control of travel rate, spray rate, and travel direction of an in-pipe tool. The subject matter described herein allows for simultaneous cleaning of an interior surface of a tubular while coating with corrosion inhibitor The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Based on current injection techniques which take place at well sites, the injected corrosion inhibitor doesn't cover the entire internal tubular surface. This happens because liquid nonvolatile corrosion inhibitors settle at the bottom portion of the tubular due to gravity leaving the gas exposed or upper pipeline surface without contact with the injected corrosion inhibitor and in a direct contact with the flow corrosive agents, such as Hydrogen Sulfide ($H_2S$), Carbon Dioxide ($CO_2$), and Acetic Acid (HAc) in the presence of condensed water droplets due to the flow temperature drop along the pipeline.

This disclosure relates to a system and method for applying and evenly spreading corrosion inhibitor along an inner surface of a tubular, such as a well casing or pipe. The system includes a tool with a central tubular configured to receive fresh corrosion inhibitor from a corrosion inhibitor pump. The central tubular defines a central flow passage and nozzles that allow fluids, such as corrosion inhibitor fluids, to spray evenly in all directions. The central tubular is supported at each end by brush pigs. As the tool is moved through a tubular, the brush pigs evenly coat the internal surface of the tubular.

Figure 1:
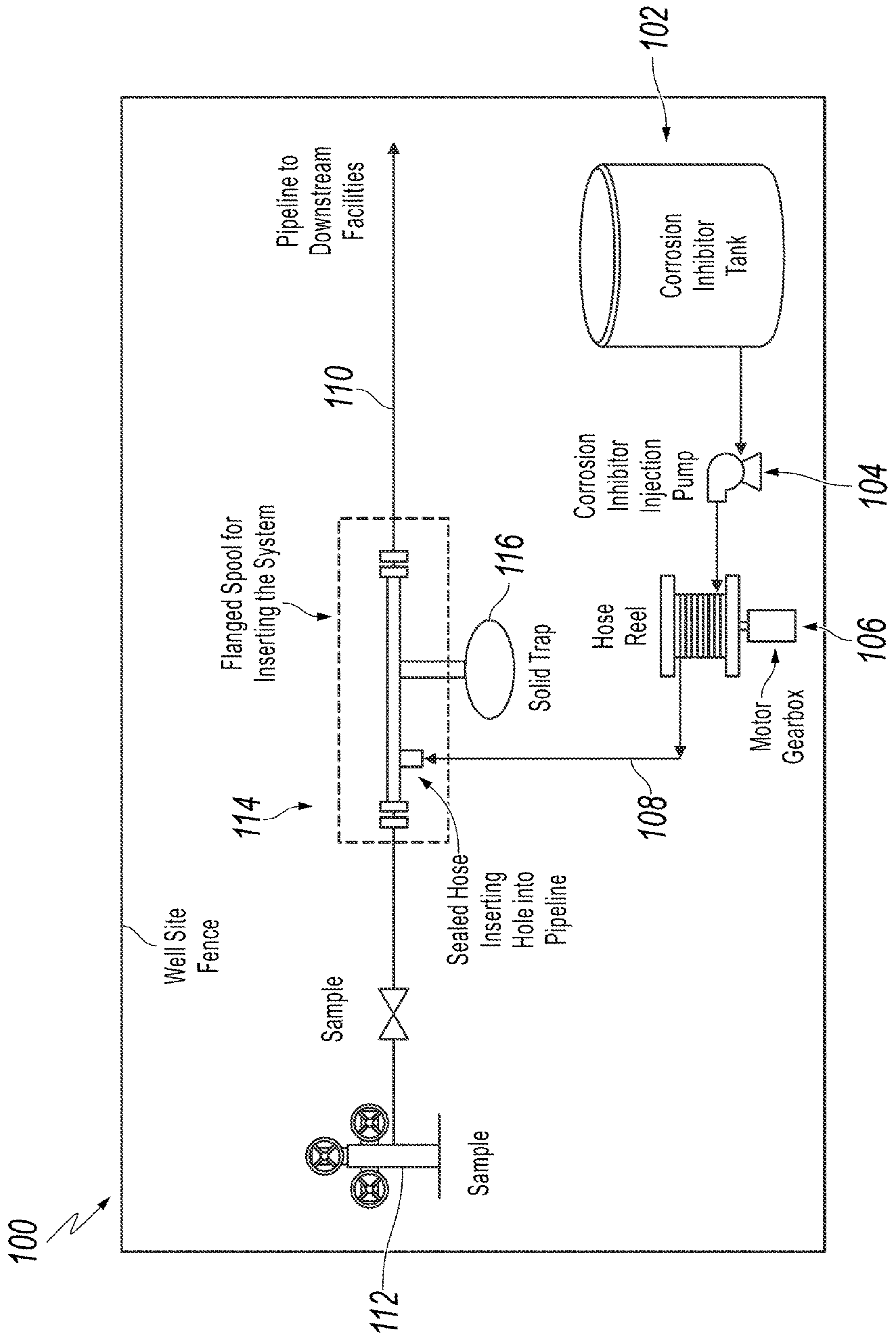
FIG. 1 is a schematic diagram of a topside portion of an example corrosion inhibitor system.

FIG. 1 is schematic diagram of a topside portion of an example corrosion inhibitor system 100. The corrosion inhibitor system 100 includes a corrosion inhibitor tank 102 coupled to a corrosion inhibitor injection pump 104. The corrosion inhibitor injection pump 104 is coupled to a hose reel 106 and hose 108. The hose 108 is coupled to a tool (described later) that can be inserted into a tubular 110. In the illustrated implementation, the tubular 110 is a flowline coupled to a wellhead 112. While the implementations and examples described within this disclosure are primarily described in the context of wellbore systems, the subject matter described herein is similarly applicable to any tubular system. The tool is inserted into the flowline (tubular 110) by an opening in a flanged spool 114. In some implementations, the flanged spool 114 includes a solid trap 116 configured to capture any solids loosened by the tool during operations. While primarily described as a flanged spool, a threaded or welded spool can be used without departing from this disclosure.

Figure 2:
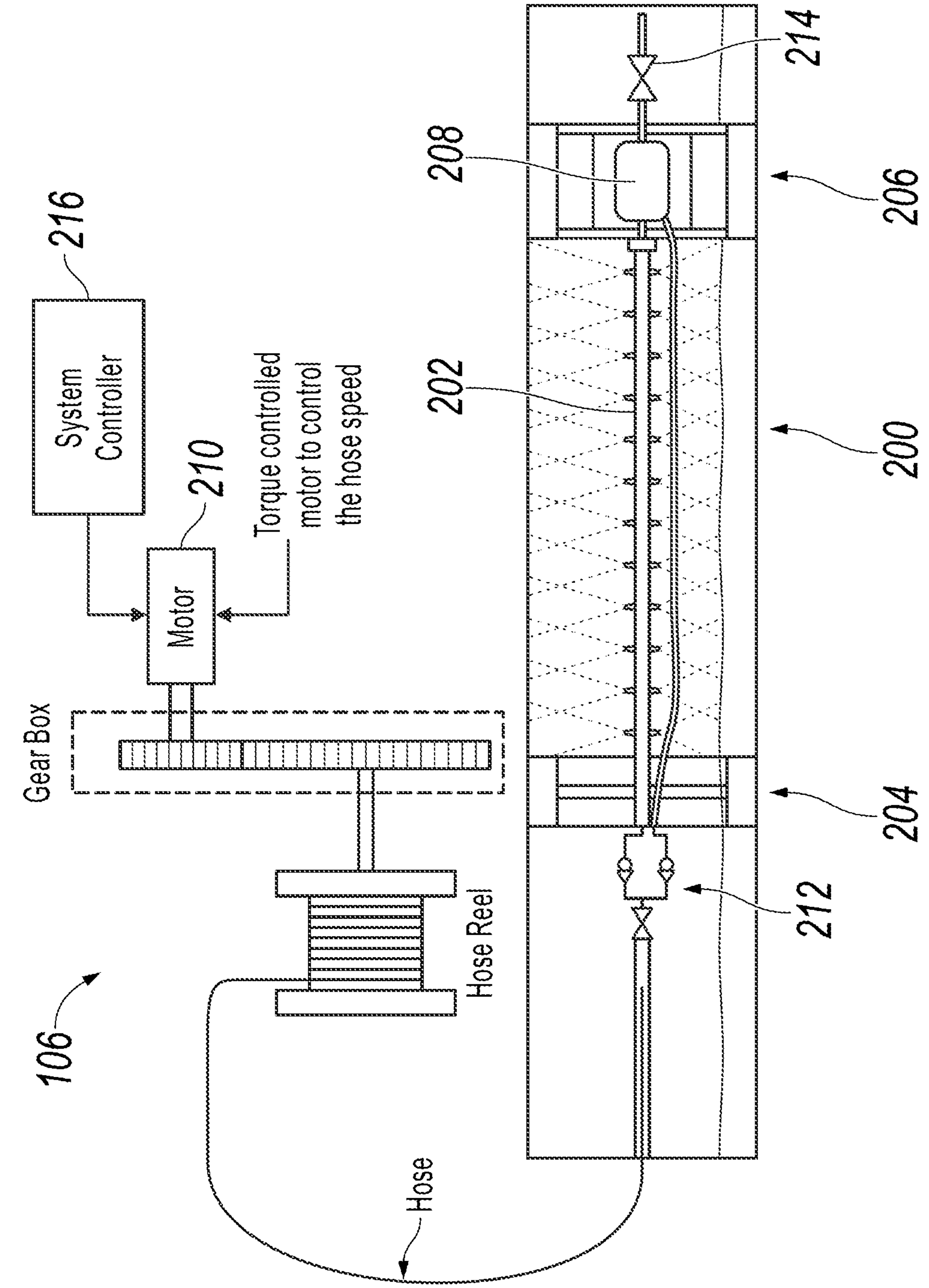
FIG. 2 is a cross-sectional diagram of the example corrosion inhibitor system moving tool within a tubular.

FIG. 2 is a cross-sectional diagram of the example corrosion inhibitor system 100 moving a tool 200 within a tubular 110. While the tubular 110 is illustrated as a horizontal tubular for simplicity, the system 100 can similarly be used with a deviated (slanted) or vertical tubular without departing from this disclosure. The tool 200 itself includes a central tubular 202 defining a central flow passage and spray nozzles along an outer circumference of the central tubular 202. The central tubular 202 itself can be a rigid pipe or a flexible hose. The central tubular is supported at a first end by first brush pig 204, and is supported at a second end by a second brush pig 206.

Within the second brush pig 206 is an inflatable balloon 208. That is, the inflatable balloon 208 is encircled by the second brush pig 206. The inflatable balloon 208 is configured to cause a first pressure drop across the balloon when in an inflated state. That is, during operation, the tool 200 can be moved by applying a pressure either uphole or downhole of the inflatable balloon 208 when in the inflated state, and the tool 200 moves in response to the pressure differential. The inflatable balloon 208, in some instances, is in a deflated state. In such instances, a pressure drop across the tool 200 decreases. That is, the pressure drop across the tool 200 when the inflatable balloon 208 is in a deflated state is less than the pressure drop across the tool 200 when the inflatable balloon is in the inflated state. Such instances can be used, for example, when flowing additional fluids down the wellbore, such as diesel for pickling operations. Alternatively or in addition, such instances are used, for example, to reduce torque on the motor 210 and hose reel 106 when the tool 200 is being retrieved. More details about states of the inflatable balloon 208, and how the inflatable balloon 208 is actuated between these states, is described throughout this disclosure. In some implementations, a system controller 216 monitors and controls aspects of the system 100, such as the motor 210 or the pump 104 (FIG. 1).

A flow control system 212 is at the first end of the central tubular 202. The flow control system 212 is configured to regulate fluid exchange with the central tubular 202, the inflatable balloon 208, and the corrosion inhibitor hose 108. That is, the flow control system 212 is configured to receive a chemical injection line connected the injection pump 104 (FIG. 1).

At the second end of the tool 200 (downhole-end depending on operations) is a relief valve 214. The relief valve 214 is configured to release pressure and fluid from the inflatable balloon 208. That is, the relief valve 214 is opened to change the inflatable balloon 208 from the inflated state to the deflated state.

Figure 3:
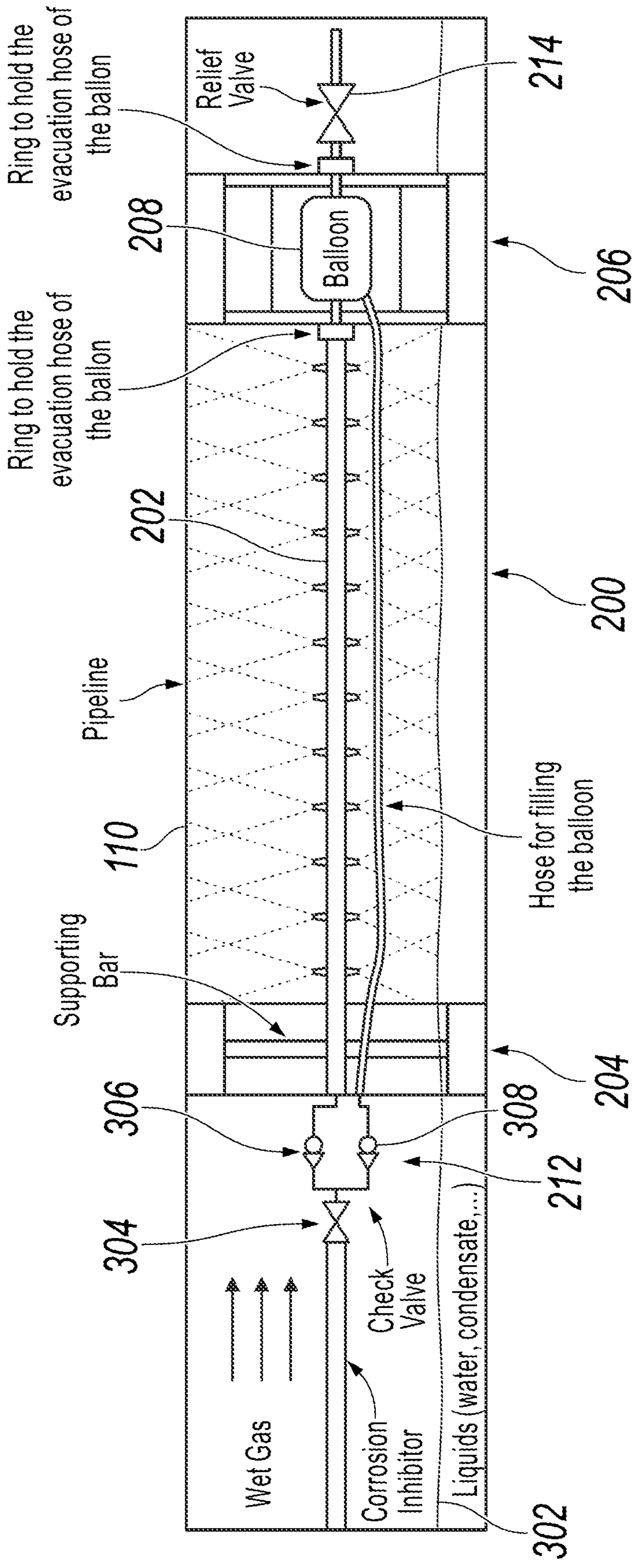
FIG. 3 is a cross-sectional diagram of the example corrosion inhibitor system moving tool within a tubular.
Figure 4B:
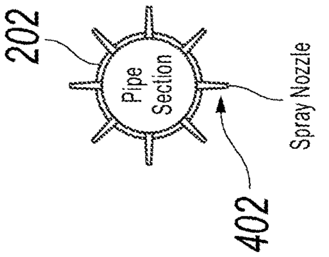
FIGS. 4A-4D are various views of the central tubular of the tool.
Figure 4D:
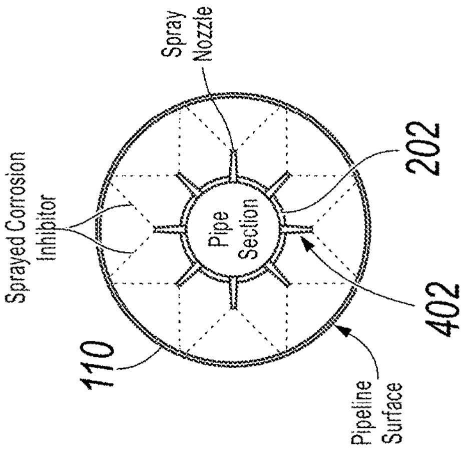
Figure 4A:
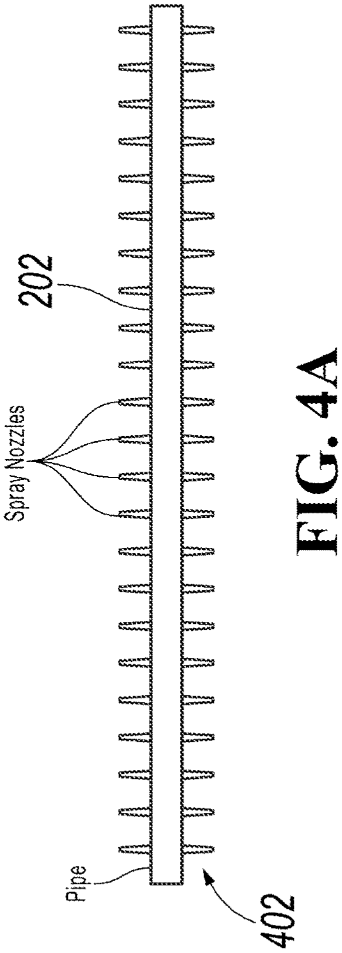
Figure 4C:
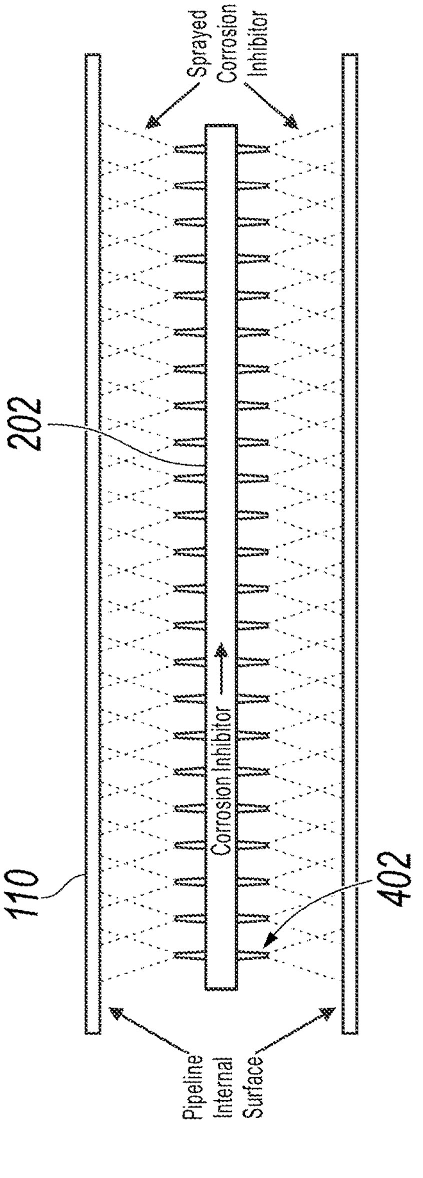

FIG. 3 is a cross-sectional diagram of the example corrosion inhibitor system tool 200 within a tubular 110. The tubular 110 can include a wellbore, a pipeline, or any other tubular. In the illustrated example, liquids 302 have collected at the bottom of the tubular 110. Referring back to the flow control system 212, the flow control system 212 includes a directional valve 304 configured to direct fluid flow to the tubular 110, the inflatable balloon 208, or both simultaneously.

The flow control system 212 also includes a first check valve 306 between the directional control valve 304 and the tubular 110. The first check valve 306 is configured to direct fluid flow towards the tubular 110 and away from the directional valve 304. That is, the first check valve 306 reduces the likelihood or fully prevents fluids from flowing back from the central tubular 202 towards the directional valve 304. A second check valve 308 is between the directional control valve 304 and the inflatable balloon 208, the second check valve 308 configured to direct fluid flow towards the inflatable balloon 208 and away from the directional valve 304. That is, the second check valve 308 reduces the likelihood or fully prevents fluid from flowing back from the inflatable balloon towards the directional valve 304.

In some implementations, the relief valve 214 is an electronically controlled valve. In some implementations, the relief valve 214 is a hydraulically, pneumatically, or mechanically controlled valve. Regardless of the type of valves used, in some implementations, the relief valve 214 is controlled by the controller 216 at the corrosion inhibitor pump. In some implementations, a controller can be included physically with the tool 200. Alternatively or in addition, the relief valve can include a frangible component, such as a rupture disk or shear pin, to operate the relief valve 214.

FIGS. 4A-4D are various views of the central tubular 202 of the tool 200. As previously discussed, the central tubular 202 can include a rigid tubular or a flexible hose. In implementations where a hose is used, the central tubular 202 is kept in tension during operations to prevent collapse of the central tubular 202. Tension is maintained through the pressure differential created by the inflatable balloon 208 (FIG. 3), the hose 108 (FIG. 2), or a combination of the two. Alternatively or in addition, rigid members can be included in addition to the central tubular 202 without departing from this disclosure. The central tubular itself defines nozzles, or ports, that fluidically connect the flow passage to an outside environment, such as an interior of the tubular 110. The nozzles 402 are arranged and defined such that the nozzles 402 provide a spray pattern that covers and/or impacts a substantial entirety (within 5%) of an interior surface of the tubular 110. Fluid is ejected from the nozzles 402 with sufficient force to reduce or eliminate the likelihood that the nozzles 402 become blocked by solid particulates. The central tubular 202 is configured to receive fluid from the pump 104 and direct the fluid evenly along an inner circumference of a tubular 110 in which the tool 200 (FIG. 3) is inserted.

Figure 5A:
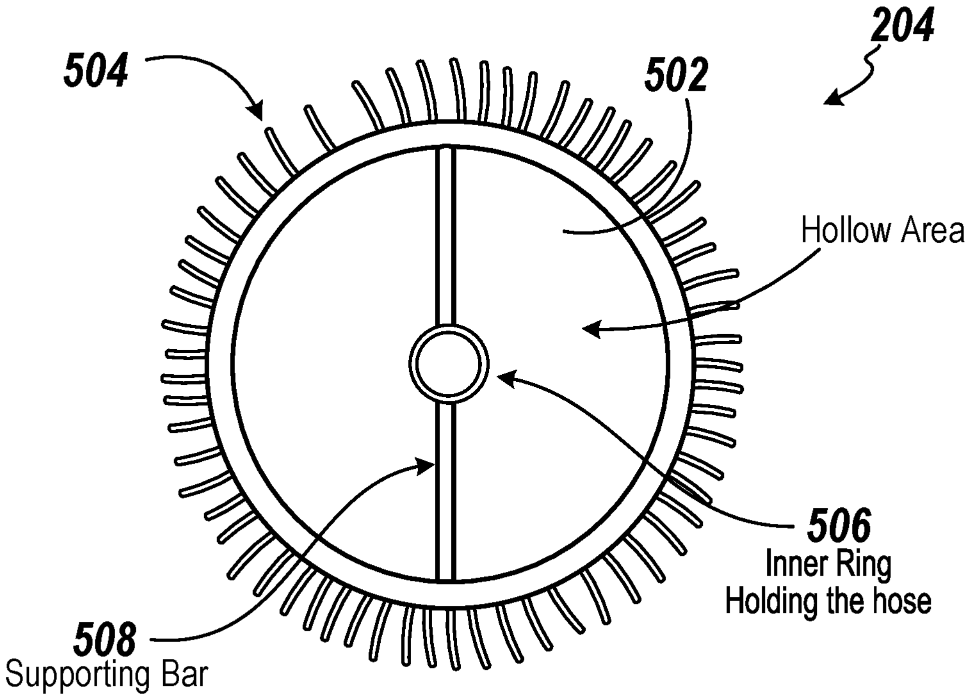
FIGS. 5A and 5B are various views of a brush pig at an uphole end of the tool.
Figure 5B:
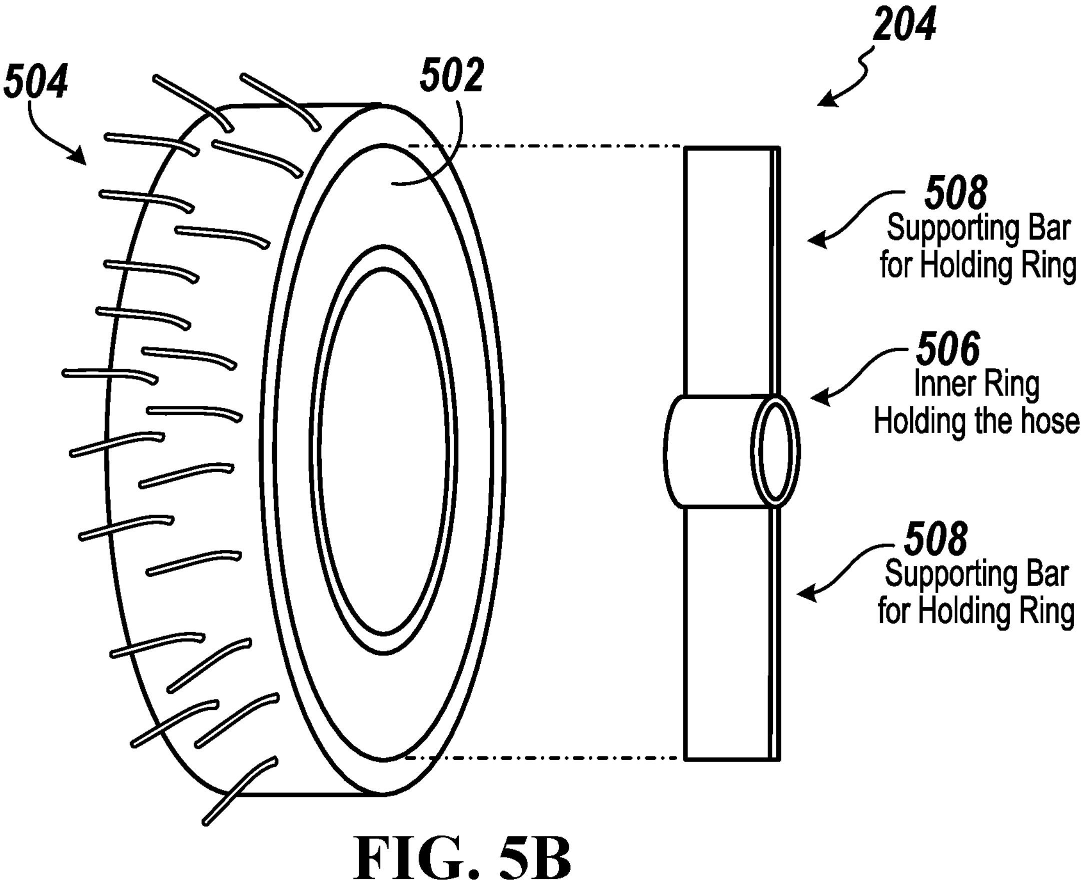

FIGS. 5A and 5B are various views of the first brush pig 204, at a first end (an uphole or upstream end depending on the operation) of the tool 200. The first brush pig 204 includes an outer ring 502 defining an inner surface and an outer surface. A brush 504 emits from the outer surface of the outer ring 502. The brush 504 is configured to evenly spread sprayed corrosion inhibitor along the interior surface of the tubular 110 (FIG. 3). An inner ring 506 is radially centered (within standard manufacturing tolerances) within the outer ring 502. The inner ring 506 is configured to support the central tubular 202 (FIG. 4A-D). A support bar 508 extends between an outer surface of the inner ring 506 and an inner surface of the outer ring 502. The support bar 508 supports the inner ring 506 to the outer ring 502. In some implementations, the support bar 508 is attached to the inner ring 506 and the outer ring with fasteners, welding, adhesives, or an interference fit. The support bar 508, the inner ring 506, and the outer ring 502 are constructed of materials of sufficient strength to support the central tubular 202 (FIG. 3).

FIGS. 6A-6D are various views of the second brush pig 206 at the second, downhole end (downstream end depending on operations) of the tool 200. The second brush pig 206 is substantially similar to the first brush pig 204 with the exception of any differences described herein.

The second brush pig 206 has two support bars 608. A first support bar **608*a* extends between an outer surface of the inner ring 606 and an inner surface of the outer ring 602. A second support bar 608*b* extends between the outer surface of the inner ring 606 and an inner surface of the outer ring 602. The first support bar 608*a* and the second support bar 608*b* axially retain the inflatable balloon 208. In some implementations, a solid disk 610 is between the inner ring 606 and the outer ring 602. The solid disk 610 is supported by the outer ring 602 and surrounds the inflatable balloon 208. In some implementations, the disk 610 is axially retained by the first support bar 608*a* and the second support bar 608*b***.

Figure 6A:
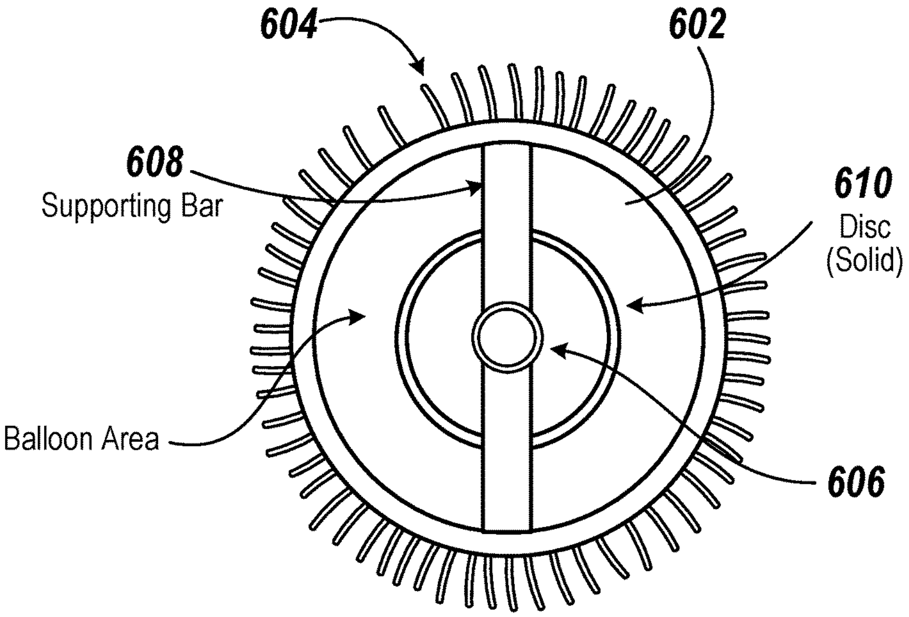
FIGS. 6A-6D are various views of a brush pig at a downhole end of the tool.
Figure 6B:
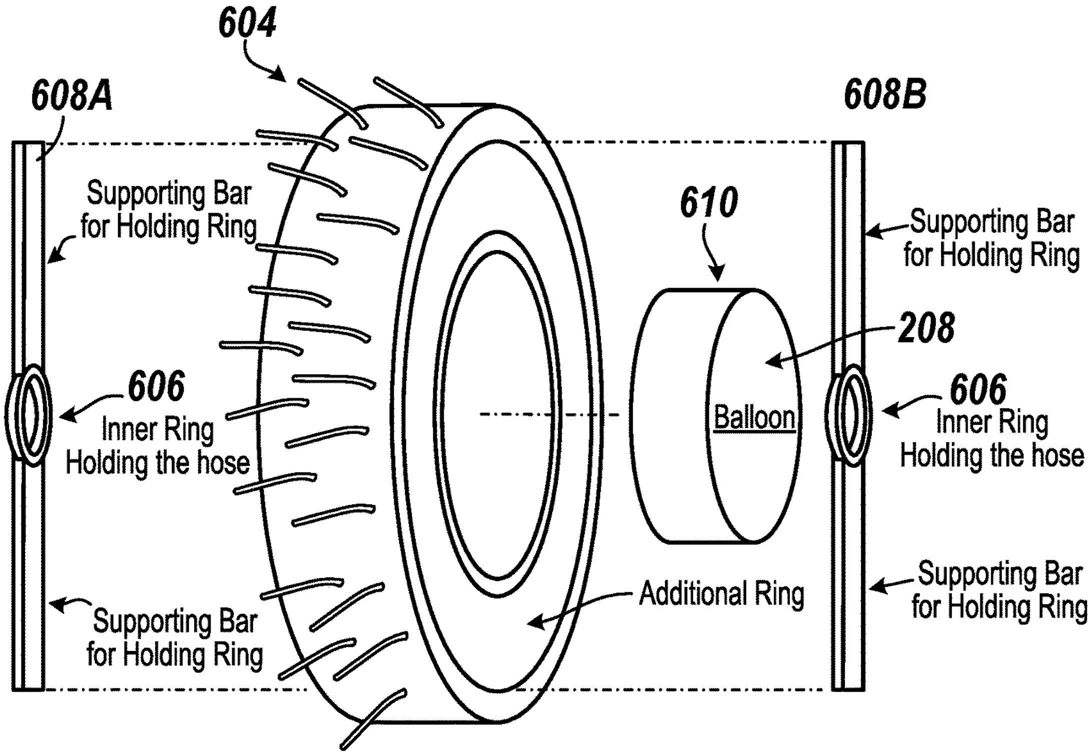
Figure 6C:
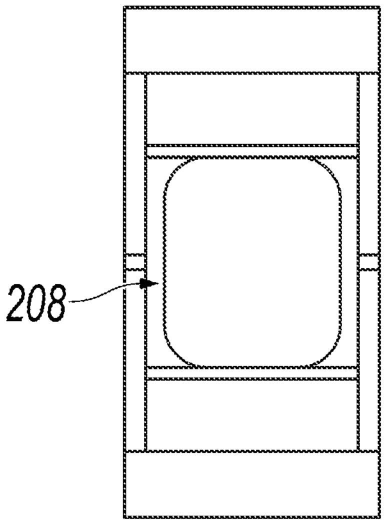
Figure 6D:
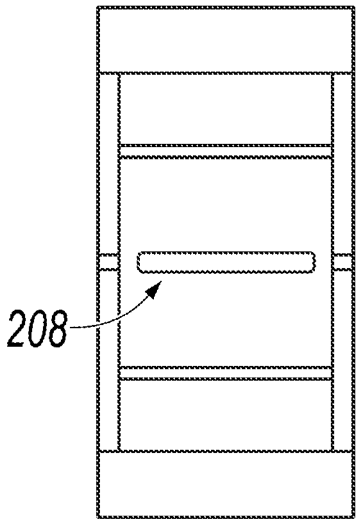

FIG. 6C illustrates the inflatable balloon 208 in the inflated state, and FIG. 6D illustrates the inflatable balloon 208 in the deflated state. As can be seen from the illustrations, the inflatable balloon 208, when in the inflated state, extends towards the disk 610. In some implementations, the inflatable balloon 208 seats against the disk 610 when in the inflated state. In the deflated state, the inflatable balloon 208 has a smaller cross sectional area, reducing the pressure drop across the tool 200 when compared to the inflatable balloon 208 being in the inflated state.

Figure 7:
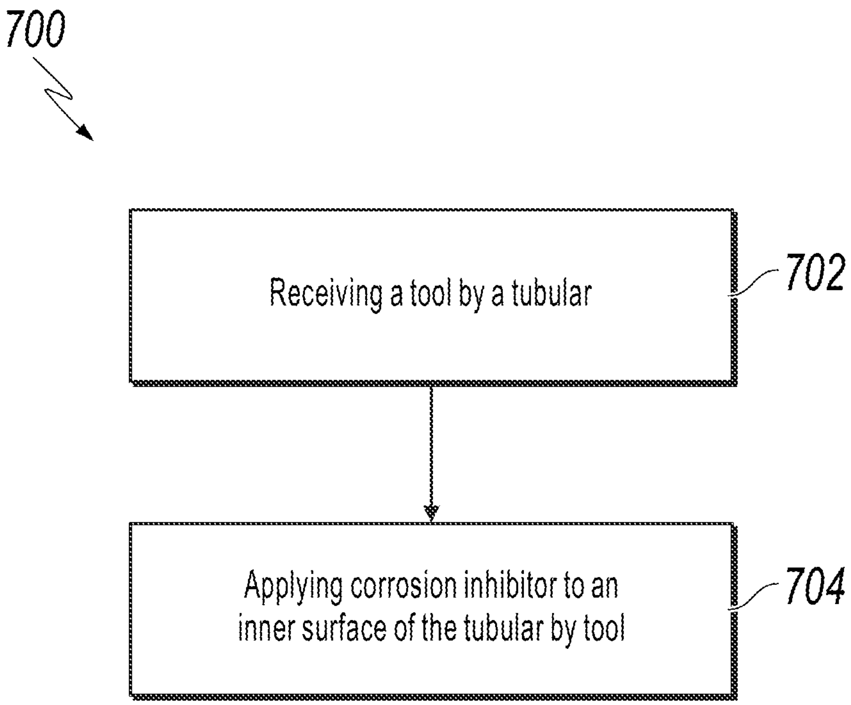
FIG. 7 is a flowchart of an example method that can be used with aspects of this disclosure.

FIG. 7 is a flowchart of an example method 700 that can be used with aspects of this disclosure. At 702, the tool 200 is received by a tubular. At 704, a corrosion inhibitor is applied to an inner surface of the tubular. In some implementations, applying corrosion inhibitor to an inner surface of the tubular includes spraying the corrosion inhibitor. In some implementations, spraying the corrosion inhibitor can be done by the central tubular 202. In some implementations, the corrosion inhibitor is spread by the brush (504, 604) along an outer surface of the first brush pig 204, the second brush pig 206, or both. Alternatively or in addition, an interior of the tubular is cleaned, scraped, or otherwise conditioned prior to receiving corrosion inhibitor by the brush (504, 604). For example, in instances where the tool 200 is traveling in a direction away from the point of entry into the tubular, the second brush 604 conditions the inner surface of the tubular 110 while the first brush spreads the corrosion inhibitor along an inner surface of the tubular.

During operation, in some instances, the inflatable balloon 208 is inflated with corrosion inhibitor pumped from the pump 104. The inflated inflatable balloon 208 creates a pressure differential across the tool 200 responsive to inflating the balloon. In some instances, this pressure differential is used to move the tool in a downhole or downstream direction (depending on the use case).

Alternatively or in addition, in some instances, the inflatable balloon 208 is deflated by the relief valve 214 fluidically coupled to the inflatable balloon 208. The deflation lowers the pressure drop across the tool 200. As such, in some instances, the tool is moved in an uphole or upstream direction by tension in the chemical supply line (hose 108) configured to supply corrosion inhibitor to the tool 200 from the pump 104. The decreased pressure drop reduces the torque on the motor 210 and the reel 106 during retrieval operations. The combination of tension and control of pressure differential allows the tool 200 to have a controllable speed in both a forward (downpipe, downhole) or backward (uphole, up-pipe) direction.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A tool system comprising:

a central tubular defining a central flow passage and spray nozzles along an outer circumference of the central tubular that fluidically connect the flow passage to an outside environment, the tubular configured to receive fluid from a corrosion inhibitor pump and direct the fluid along an inner circumference of a tubular in which the tool is inserted;

a first brush pig supporting a first end of the central tubular, the first brush pig configured to support the first end of the central tubular;

a second brush pig supporting a second end of the central tubular, the second brush pig configured to support the second end of the central tubular;

an inflatable balloon at the second end of the central tubular, the inflatable balloon encircled by the second brush pig, the inflatable balloon configured to cause a first pressure drop in the fluid across the inflatable balloon when in an inflated state, and cause a second pressure drop in the fluid, less than the first pressure drop, across the inflatable balloon when in a deflated state; and a flow control system at the first end of the central tubular, the flow control system configured to regulate fluid exchange with the central tubular and fluid exchange with the inflatable balloon, the flow control system configured to receive a chemical injection line connected to the corrosion inhibitor pump.

2. The tool system of claim 1, wherein the first brush pig comprises:

an outer ring defining an inner surface and an outer surface;

a brush emitting from the outer surface of the outer ring;

an inner ring radially centered within the outer ring, the inner ring configured to support the central tubular; and a support bar extending between an outer surface of the inner ring and an inner surface of the outer ring, the support bar supporting the inner ring to the outer ring.

3. The tool system of claim 1, wherein the second brush pig comprises:

an outer ring defining an inner surface and an outer surface;

a brush emitting from the outer surface of the outer ring;

an inner ring radially centered within the outer ring, the inner ring configured to support the central tubular and the inflatable balloon;

a first support bar extending between an outer surface of the inner ring and an inner surface of the outer ring, the support bar supporting the inner ring to the outer ring;

a second support bar extending between an outer surface of the inner ring and an inner surface of the outer ring, the support bar supporting the inner ring to the outer ring, the first support bar and the second support bar axially retaining the inflatable balloon; and a solid disk between the inner ring and the outer ring, the solid disk being supported by the outer ring, the solid disk surrounding the inflatable balloon.

4. The tool system of claim 1, wherein the flow control system comprises:

a directional valve configured to direct fluid flow to the central tubular or the inflatable balloon;

a first check valve between the directional control valve and the central tubular, the first check valve configured to direct fluid flow towards the central tubular; and a second check valve between the directional control valve and the inflatable balloon, the second check valve configured to direct fluid flow towards the inflatable balloon.

5. The tool system of claim 4, wherein the directional valve is an electronically controlled valve.

6. The tool system of claim 5, wherein the electronically controlled valve is configured to be controlled by a controller at the corrosion inhibitor pump.

7. The tool system of claim 5, further comprising:

a relief valve at a downhole end of the tool, the relief valve configured to release pressure from the inflatable balloon.

8. A system comprising:

a hose reel;

a hose coupled to the hose reel;

a chemical injection pump arranged to supply corrosion inhibitor through the hose; and a tool comprising:

a central tubular defining a central flow passage and spray nozzles fluidically connecting the flow passage to an outside environment;

a first brush pig supporting a first end of the central tubular;

a second brush pig supporting a second end of the central tubular;

an inflatable balloon at the second end of the central tubular, the inflatable balloon encircled by the second brush pig; and a flow control system at the first end of the central tubular, the flow control system configured to regulate fluid exchange with the central tubular and fluid exchange with the inflatable balloon, the flow control system configured to receive a chemical injection line.

9. The system of claim 8, wherein the first brush pig comprises:

an outer ring defining an inner surface and an outer surface;

a brush emitting from the outer surface of the outer ring;

an inner ring radially centered within the outer ring, the inner ring configured to support the central tubular; and a support bar extending between an outer surface of the inner ring and an inner surface of the outer ring, the support bar supporting the inner ring to the outer ring.

10. The system of claim 8, wherein the second brush pig comprises:

an outer ring defining an inner surface and an outer surface;

a brush emitting from the outer surface of the outer ring;

an inner ring radially centered within the outer ring, the inner ring configured to support the inflatable balloon;

a support bar extending between an outer surface of the inner ring and an inner surface of the outer ring, the support bar supporting the inner ring to the outer ring; and a solid disk between the inner ring and the outer ring, the solid disk being supported by the outer ring.

11. The system of claim 8, wherein the flow control system comprises:

a directional valve configured to direct fluid flow to the central tubular or the inflatable balloon;

a first check valve between the directional control valve and the central tubular, the first check valve configured to direct fluid flow towards the central tubular; and a second check valve between the directional control valve and the inflatable balloon, the second check valve configured to direct fluid flow towards the inflatable balloon.

12. The system of claim 11, wherein the directional valve is an electronically controlled valve.

13. The system of claim 12, wherein the electronically controlled valve is configured to be controlled by a controller at the chemical injection pump.

14. The system of claim 8, further comprising:

a relief valve at a downhole end of the tool, the relief valve configured to release pressure from the inflatable balloon.

* * * * *